United States Patent [19]
Feig et al.

[11] Patent Number: 5,268,938
[45] Date of Patent: Dec. 7, 1993

[54] REDUNDANCY SCHEME FOR FOURIER TRANSFORM CODING ON PEAK LIMITED CHANNELS

[75] Inventors: Ephraim Feig, Briarcliff Manor; Frederick C. Mintzer, Shrub Oak, both of N.Y.

[73] Assignee: International Business Machines Corporation, Armonk, N.Y.

[21] Appl. No.: 822,793

[22] Filed: Jan. 21, 1992

[51] Int. Cl.$^5$ ............................................. H04B 1/66
[52] U.S. Cl. .................................... 375/122; 381/29; 364/725; 375/27
[58] Field of Search ........................... 375/122, 25, 27; 379/98; 358/133; 364/724.2, 725; 381/31, 29, 30

[56] References Cited

U.S. PATENT DOCUMENTS

| | | | |
|---|---|---|---|
| 4,058,713 | 11/1977 | DiToro | 364/724 |
| 4,169,245 | 9/1979 | Crom et al. | 364/604 |
| 4,208,548 | 6/1980 | Orban | 381/94 |
| 4,221,934 | 9/1980 | Schiff | 370/7 |
| 4,679,227 | 7/1987 | Hughes-Hartogs | 379/98 |
| 4,715,029 | 12/1987 | Crookshanks | 370/700 |
| 4,768,159 | 8/1988 | Gray et al. | 364/726 |
| 4,817,114 | 3/1989 | Boer et al. | 375/8 |
| 5,054,034 | 10/1991 | Hughes-Hartogs | 375/8 |

OTHER PUBLICATIONS

"The Performance of Fourier Transform Division Multiplexing Schemes On Peak Limited Channels", Feig et al. IBM Research Division, 1988.

"Digital Implementation of Frequency Division Multiplexing on Peak-Limited Channels", Fieg et al., RC 14440 IBM Research Division, Feb. 17, 1989.

"Linear Methods for High-Density Magnetic Recording of Data", Ephraim Feig, *IEEE Transactions of Magnetics*, vol. 25, No. 3, 1989.

"Practical Aspects of DFT-Based Frequency Division Multiplexing for Data Transmission", Ephraim Feig. *IEEE Trans. on Communications*, vol. 38, No. 7, 1990.

"Sequence Transmission: Coding in the Frequency Domain", Feig et al., *Sequences*, R. M. Capocelli, ed., Springer-Verlag, 1990.

"Frequency Domain Data Transmission using Reduced Computational Complexity Algorithms", Peled et al., *Proc. IEEE Intl. Conf. on Acoustics, Speech and Signal Processing*, Denver, Colo., pp. 964-967, Apr. 1980.

"Data Transmission by Frequency-Division Multiplexing Using the Discrete Fourier Transform", Weinstein et al. *IEEE Trans. on Comm. Tech.*, vol. Com-19, No. 5, 1971.

*Primary Examiner*—Curtis Kuntz
*Assistant Examiner*—T. Ghebretinsae
*Attorney, Agent, or Firm*—Sterne, Kessler, Goldstein & Fox

[57] ABSTRACT

A system and method for fourier transform coding of data on peak limited channels using a redundancy scheme. The system and method section the data to be transmitted into contiguous blocks having sequence lengths of 2N. Each block is coded in the frequency domain and its Inverse Discrete Fourier Transform (IDFT) for each coded block is computed. The IDFT blocks are then clipped at predetermined peak values ± P to thereby derive clipping error values. The magnitude of the clipping error values is then determined. The magnitude squared values of the clipping error is summed for each block. If the sum exceeds a threshold $\phi$ for a given block, then, the block is transmitted X number of times, where X is a fixed number, each time using less than the prescribed power for the transmission, otherwise, a continuous signal is transmitted whose sampled values at the Nyquist rate are the clipped values of the IDFT for that particular block.

19 Claims, 6 Drawing Sheets

REDUNDANCY SCHEME FOR FOURIER TRANSFORM CODING ON PEAK LIMITED CHANNELS

TECHNICAL FIELD

The field of the invention relates generally to signal processing on peak limited channels. More specifically, the system and method in conjunction with the present invention concern a redundancy scheme for fourier transform coding on peak limited channels.

BACKGROUND ART

The present invention addresses the issue of peak-limited data channels. While many conventional coding schemes suggest the superposition of many channels which are separated in the frequency domain, they all assume that the superposition will not pose serious problems such as overloading the channel. When the number of superposed channels is relatively small, this concern may indeed not arise in most applications. Several conventional systems contemplate superposing many hundreds if not thousands of signals per channel. Channel overloading may therefore become a serious problem.

Furthermore, the present invention addresses the overloading issue for a particular method of signal superposition, the Fourier transform method, which is becoming more commonly used in the field. See U.S. Pat. No. 4,679,227 to Hughes-Hartogs (the '227 patent), for example. The '227 patent teaches a modem which uses 256 channels superposed together. However, the '227 patent ignores the peak limited (e.g., overloading) problem. Based on the fact that traditional signaling such as QAM avoid overloading altogether, the problem is generally ignored even in the theory community. Fourier Transform Coding (FTC) sections data into contiguous blocks, codes in the Frequency Domain, computes the Discrete Fourier Transform (DFT) of the code, and then transmits a continuous signal whose sampled values at the Nyquist rate are the output of DFT. See Weinstein et al., "Data Transmission by Frequency-Division Multiplexing Using the Discrete Fourier Transform," *IEEE Trans. on Comm. Tech. Vol. COM*-19, No. 5, Oct. 1971. Practical methods of FTC coding and decoding are also discussed by Feig et al., "Sequence Transmission: Coding in the Frequency Domain," Presented at the Advanced International Workshop on Sequences Honoring Paul Erzos' 75the Birthday, Pasitano, Italy, Jun. 1988, (also appeared in *Sequences*, I.M. Capocelli, ed., Springer-Verlag, 1990).

A reduced computational method and adaptive equalization for FTC coding are introduced by Peled et al. in their article titled, "Frequency Domain Data Transmission Using Reduced Computational Complexity Algorithms,"

Proc. IEEE Intl. Conf. on coustics, Speech, and Signal Processing, Denver Colo. pp. 964-967, Apr. 1980. See "Linear Methods for High-Density Magnetic Recording of Data" by Ephraim Feig, *IEEE Transactions on Magnetics*, Vol. 25, No. 3, 1989, for a discussion of how to endure errors due to clipping at peak amplitude values.

FTC processed signals sometimes have very large amplitude segments which must be clipped at some prescribed peak value $\pm P$ in order to retain channel linearity, because peak-limited channels can not accept arbitrarily large impulses. (See Feig et al., "The Performance of Fourier Transform Division Multiplexing Schemes on Peak Limited Channels," IBM RC 1988; Feig et al., "Digital Implementation of Frequency Division Multiplexing on Peak-Limited Channels," IBM RC 14440, Feb. 1989; and Ephraim Feig, "Fourier Transform Coding for Peak Limited Channels," *Proc. of the Twenty Sixth Annual Allerton Conf. on Communicaton, Control, and Computing*. 1988.) In conventional systems the clipped sequence rather that the original DFT output is passed through a lowpass filter and then the data is transmitted. This technique clearly ignores the information corresponding to the clipped signal. A need therefore exists to convey both the clipped signal and the error over peak limited channels.

DISCLOSURE OF THE INVENTION

The system and method in conjunction with the present invention (the present invention) computes some measure of the clipping error for each block of information to be transmitted, such as the sum of the magnitude squared values of the clipping error. If the sum or other measure exceeds a certain threshold, $\theta$ then the block is transmitted X times, each time using less than the usually prescribed power for transmission.

Each block is comprised of a number of channels or bins. A special bin in each block is reserved to encode whether the block is a repeated block or not. This bin accepts one of several possible complex numbers which are far apart (in Euclidean distance) so that the probability of error in this particular bin is negligible.

At the encoder, after an inverse DFT is performed, the value of the special bin is checked. Whenever the special bin indicates that the block is a repeat, the value of each bin from the block is incorporated in a cumulative sum corresponding to the bin; most frequently, information will not be summed. The rest of the decoding proceeds in the standard method for FTC schemes.

The present invention further relates to a system and method for transmitting signals which encode blocks of data on a channel which is limited with respect to the peak amplitude of the transmitted signal. In the case of a signal from a Fourier transform code block of data, momentary segments of the signal can have a high peak amplitude even though the average power of the signal is relatively low. The present invention involves processing the signal prior to transmission to obtain a measure of the cumulative amount by which the absolute value of the signal exceeds the prescribed peak amplitude value permitted by the channel. A particular choice for this measure is the sum of the magnitude squared of the difference between the absolute value of the sampled value of the signal which exceeds the peak amplitude value in absolute value and the peak amplitude value itself If the amount exceeds a certain predetermined threshold, $\Theta$, the signal is transmitted X times, with the signal attenuated to 1/X of the usually prescribed power for transmission. Control data is transmitted with each signal to specify whether or not the signal is repeated.

The foregoing and other objects, features and advantages of the present invention will be apparent from the following more particular description of preferred embodiments of the invention, as illustrated in the accompanying drawings.

Brief Description Of The Drawings

The invention will be better understood if reference is made to the accompanying drawings in which.

BEST MODE FOR CARRYING OUT THE INVENTION

Figure 1:
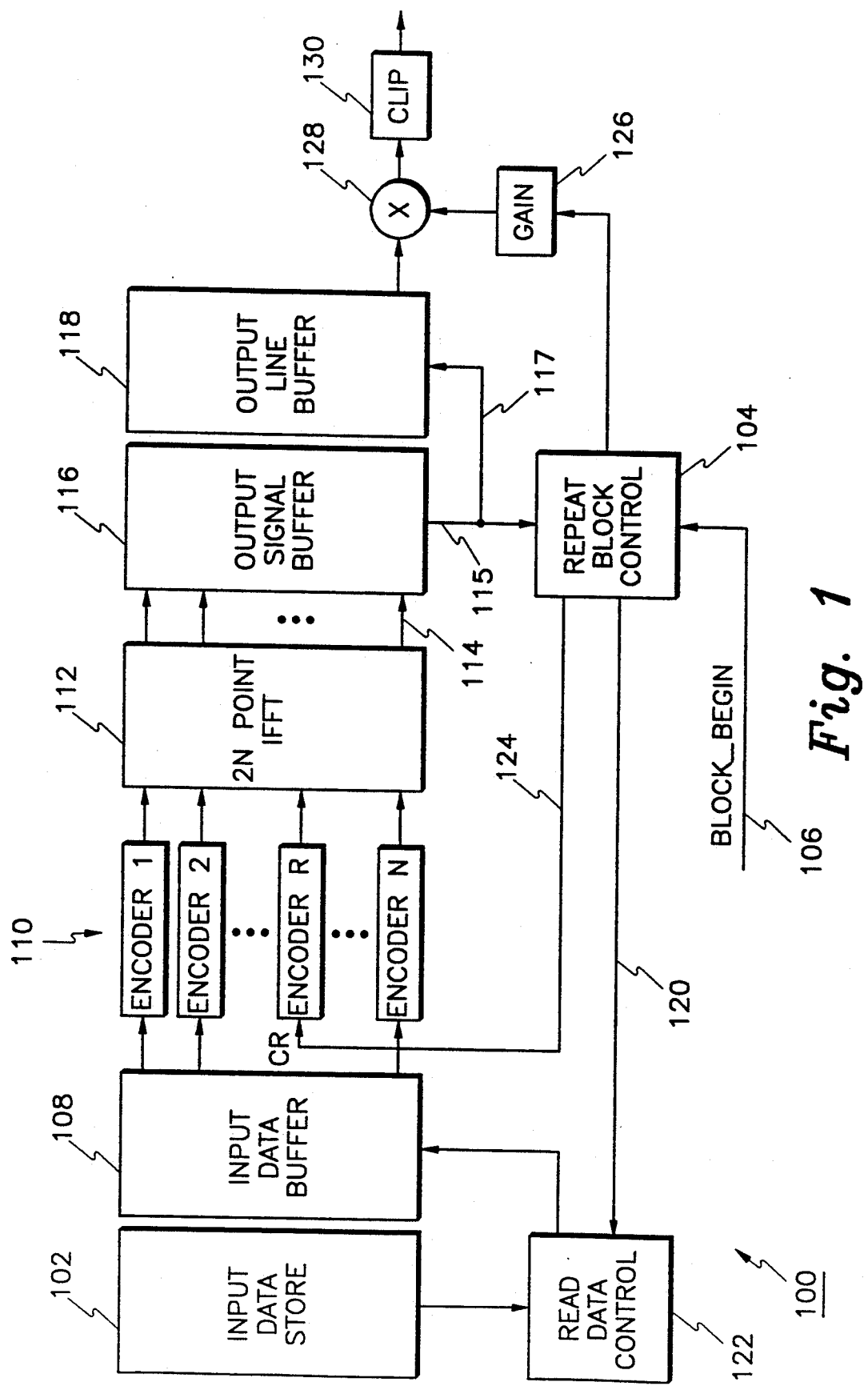
FIG. 1 shows a block diagram of a transmitter system in conjunction with the present invention.

A transmitter system 100 in conjunction with a preferred embodiment of the present invention will now be discussed with reference to the block diagram shown in FIG. 1. Initially, data to be transmitted resides in an INPUT DATA STORE 102. The transmitter system 100 transforms each block of input data into one, or several, output signal blocks. When multiple output signal blocks are used to transmit a single data block, subsequent blocks, i.e., those after the first block, are referred to as "repeated blocks," although the subsequent blocks are not strictly identical to the first output signal block by virtue of appended control data. The number of subsequent blocks is also referred to as the "repeat count."

The logic that determines how many output signal blocks are to be used to transmit a block of data resides in the REPEAT BLOCK CONTROL unit 104 for determining the beginning of the time interval for producing an output block. A BLOCK—BEGIN signal 106 provides the basic timing mechanism. The BLOCK—BEGIN signal 106 indicates the beginning of the time interval during which the next output block is to be determined.

The REPEAT BLOCK CONTROL unit 104 also determines whether to transfer, or not transfer, a block of data to an INPUT DATA BUFFER 108. If a new block of data is not transferred to the INPUT DATA BUFFER 108, the prior data block is reprocessed.

From the INPUT DATA BUFFER 108, various data components (sequences of bits) are passed to a set of N encoders, ENCODER 1 through ENCODER N (shown generally at reference numeral 110), which map the various components onto signal constellations. Each encoder 110 may have its own signal constellation, as will become evident to those skilled in the art and familiar with conventional FTC encoder schemes.

One encoder, ENCODER R, is dedicated to encoding a "repeat signal" that indicates whether further signal blocks will be used to complete the transmission of the data block. It is anticipated that most data blocks will require one output signal block, but as will be discussed below, a set of clipped signals may be assigned more than one output signal block, if the sum of the squared error values exceeds the threshold value. Also, the number of repetitions may be variable and controlled by the REPEAT BLOCK CONTROL unit 104 depending on the clipping error, or may be fixed. The number of repetitions will be further addressed below in the REPEAT BLOCK CONTROL Unit section.

The output sequence of constellation values (complex numbers) are then symmetrized and passed through a 2N POINT IFFT unit 112 that performs a conventional inverse Fast Fourier Transform. The output of the 2N POINT IFFT unit 112 is a sequence of 2N real-valued numbers that are passed to an OUTPUT SIGNAL BUFFER 116 (see reference numeral 114), from which the sequence is directed to the REPEAT BLOCK CONTROL unit 104 and an OUTPUT LINE BUFFER 118 (see reference numerals 115 and 117, respectively).

Figure 2:
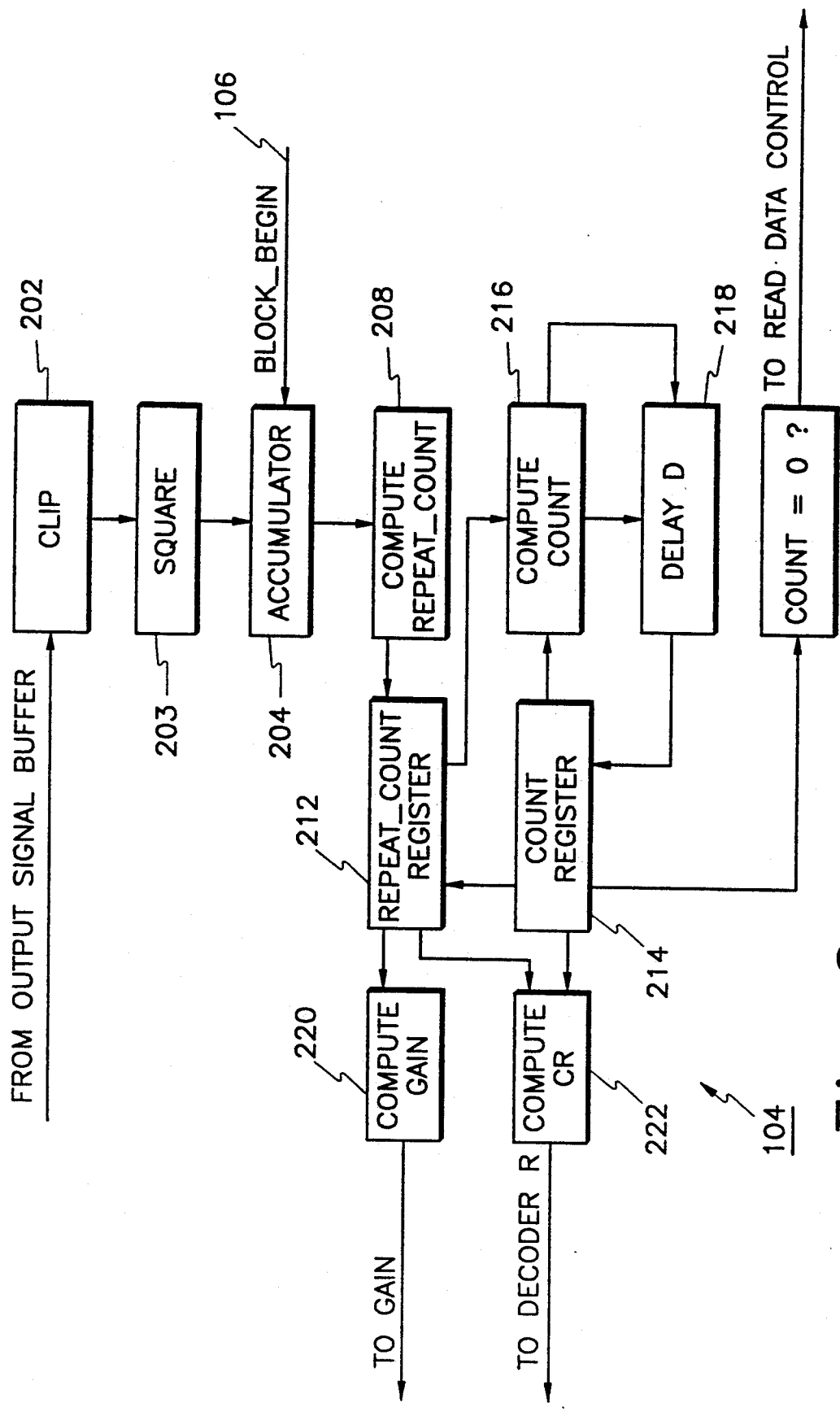
FIG. 2 shows a block diagram of the repeat block control subsystem of the transmitter system of FIG. 1.

The REPEAT BLOCK CONTROL unit 104 receives the signals (see reference numeral 115) from the OUTPUT SIGNAL BUFFER 116, and determines whether a "repeat" transmission is required. The REPEAT BLOCK CONTROL unit 104 then signals a READ DATA CONTROL unit 122 of this determination (see reference numeral 120), and signals the ENCODER R (see reference numeral 124) with a number that indicates this determination. The REPEAT BLOCK CONTROL unit 104 then sets a GAIN parameter 126, which is an attenuation factor. The GAIN parameter is the value input to a multiplier unit 128, which is used to adjust the amplitude of the output signal blocks. Operation of the REPEAT BLOCK CONTROL unit 104 will later be described with reference to FIG. 2.

The signal exiting from the OUTPUT LINE BUFFER 118 is multiplied by the attenuation factor, GAIN 126, and clipped, in a CLIP unit 130, before transmission. There is an approximate delay of one block interval between the time the signals are received by the OUTPUT LINE BUFFER and the time they exit the OUTPUT LINE BUFFER.

REPEAT BLOCK CONTROL Unit

The REPEAT BLOCK CONTROL unit 104 measures the error due to standard clipping of the coded block signals and decides whether or not to use additional signal blocks to transmit the current data block, and with what attenuation factor. The REPEAT BLOCK CONTROL unit 104 also provides "repeat" information to ENCODER R (as in FIGS. 1 and 2), as the datum CR. The method of operation of the REPEAT BLOCK CONTROL unit 104 will also be discussed with reference to the flow chart shown in FIG. 2B.

Figure 2B:
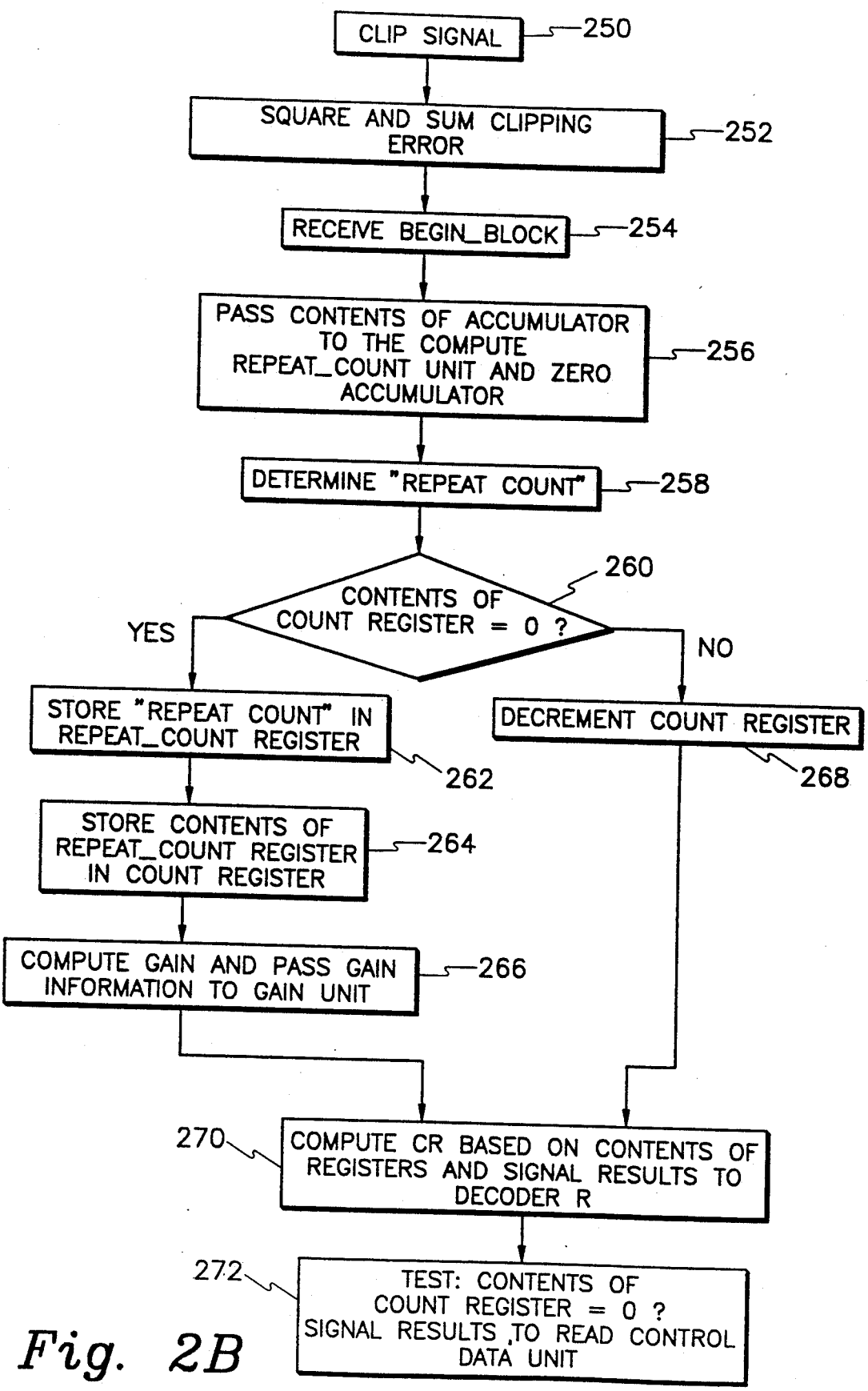
FIG. 2B shows a block diagram of a method in accordance with the repeat block control subsystem of FIG. 2.

The signal arriving from the OUTPUT SIGNAL BUFFER 116 is first passed through a CLIP unit 202, as also shown at step 250 in FIG. 2B. The clipping error is then squared at a SQUARE unit 203, and summed in an ACCUMULATOR 204. (See step 252). At the beginning of a block interval, the contents of the ACCUMULATOR 204 is passed to the COMPUTE REPEAT—COUNT unit 208 and the contents of the ACCUMULATOR 204 is reset to zero. The beginning of the block interval is indicated by arrival of the BLOCK—BEGIN signal 106. The arrival is shown at step 254 of FIG. 2B, and the passing of the contents and zeroing is shown at step 256.

The COMPUTE REPEAT—COUNT unit 208 receives the sum of the squared clipping errors at the beginning of the block interval and determines whether or not to "repeat" the block in transmission. (See step 258) The contents of a COUNT REGISTER 214 are checked to determine whether the total number of signal blocks needed to complete transmission of the previous data block has been processed. This condition is checked by testing if COUNT REGISTER =0? (see block 260 of FIG. 2B). If the result is YES, the result of the COMPUTE REPEAT—COUNT unit 208, which is called the "repeat count," is stored in a REPEAT—COUNT REGISTER 212 (see steps 262).

The value of repeat count may be based on one or more predetermined threshold levels. The threshold Θ is chosen simultaneously with the FTC code as a design parameter to meet a desired error probability. More will be said about this choice in a later section. Thus, the repeat count may vary depending on the sum of the squares of the clipping error determined by the ACCUMULATOR 204. The contents of the REPEAT—COUNT REGISTER 212, which represents the total number of signal blocks required to transmit the current data block, is stored in the COUNT REGISTER 214 (see step 264).

The value of the GAIN 126 is determined from the contents of the REPEAT—COUNT REGISTER using a COMPUTE GAIN unit 220, and is sent to the multiplier unit 128 (see step 266 of FIG. 2B).

The contents of the COUNT REGISTER 214 are updated once during each block interval, at a time D seconds after the block interval has begun. This is done by a COMPUTE COUNT unit 216, the results of which are delayed by a DELAY D (218). If, at this time, the contents of the COUNT REGISTER 214 is not zero, the contents of the COUNT REGISTER 214 is decremented by one (see step 268 of FIG. 2B).

A datum (or flag) CR is determined using a COMPUTE CR unit 222. The value of CR is determined based on information from both the contents of the REPEAT—COUNT REGISTER 212 and the COUNT REGISTER 214 (see step 270 of FIG. 2B).

The datum CR is a representation encoded by ENCODER R that is used by the receiver to determine the number of transmitted/received signal blocks that comprise a single data block. Each of the signal blocks that comprise a given data block are reduced in amplitude by the calculated attenuation at the receiver. The signal blocks will then be added together to generate the original data block.

The contents of the COUNT REGISTER 214 is also used to signal the READ DATA CONTROL unit 122 when a new block of data is to be read when COUNT=0 (see step 272 of FIG. 2B), or not read when COUNT≠0. When COUNT≠0 the data block in the input data buffer is used again to generate the next signal block.

Consider an example where K signal blocks are required to transmit a data block This entails a REPEAT—COUNT of K−1. The value of GAIN, for all the signal blocks, might be the quantity 1/K. The value of CR for the first signal block, COUNT=REPEAT—COUNT>−0, might take on the value of the index for constellation point 1.0 when it is encoded by ENCODER R. Prior to transmission, this value, 1.0, is multiplied by the attenuation factor, 1/K, in the transmitter. This will result in a transmitted value of 1.0/K. When received by the receiver, this value will be recognized as a value of 1.0/K. Recognition of this value, at the receiver, will indicate that all signal blocks for the current data block have not been received. The value of CR for a subsequent signal block, REPEAT—COUNT>COUNT>0, might be the index for a constellation point of value 0.0 (zero). Prior to transmission, this value, 0.0, is multiplied by the attenuation factor, 1/K, in the transmitter. This will result in a transmitted value of 0.0. When received by the receiver, this value will be added to the previous result, 1.0/K, to form a cumulative value of 1.0/K. Recognition of this value, at the receiver, will again indicate that all signal blocks for the current data block have not been received.

The value of CR for the last signal block, COUNT=0, might be the index for constellation point K−1.0. The transmitter will multiply this value, K−1.0, by the attenuation factor, 1/K. This will result in a transmitted value of (K−1.0)/K. When received by the receiver, this value will be added to the previous result, 1.0/K, to form a cumulative value of 1.0. Recognition of this value, at the receiver, will indicate that all signal blocks for the current data block have been received. Many variations of the COMPUTE CR unit and the REPEAT BLOCK CONTROL unit will become evident to those skilled in the art.

MODIFIED FTC RECEIVER

Figure 3:
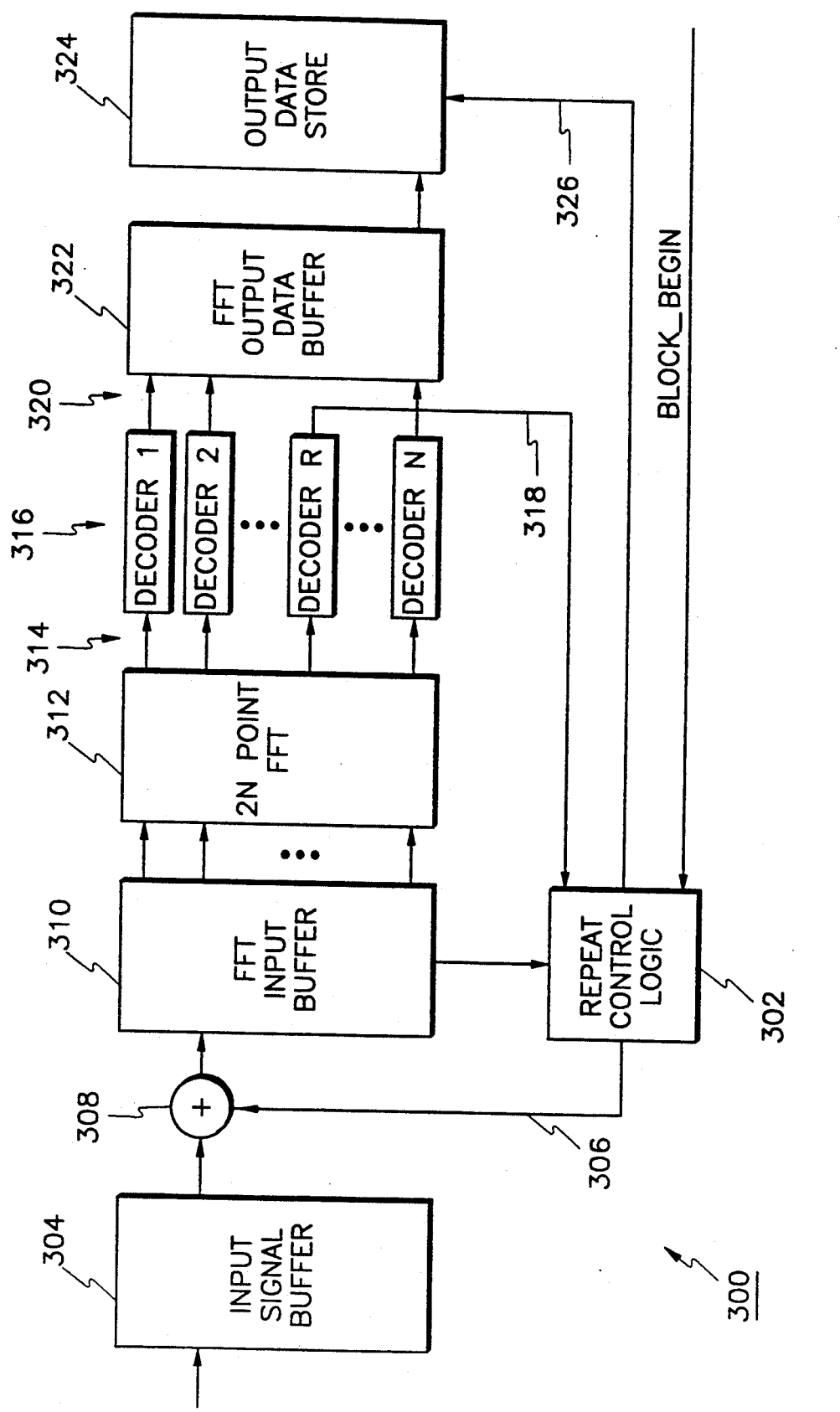
FIG. 3 shows a block diagram of a modified FTC receiver in conjunction with the present invention.

A modified FTC receiver 300 in conjunction with the present invention is shown in FIG. 3; it is essentially the inverse of the transmitter shown in FIG. 1. The purpose of the modified FTC receiver 300 is to pointwise add the signals from the received signal blocks that were associated with a data block, and to transform these added signal blocks into a data block that closely approximates the transmitted data block.

An important part of the receiver of the present invention is the determination of the number of signal blocks that were used to transmit the data block. The number of signal blocks needed to transmit the data block, minus one, is denoted as the "repeat count." Detection of those situations in which multiple signal blocks were used to transmit a data block is the responsibility of a REPEAT CONTROL LOGIC unit 302, which is described below with reference to FIG. 5.

For the purpose of discussion of the present invention, it can be assumed that a block of received signals is already stored in a INPUT SIGNAL BUFFER 304. Those skilled in the art will readily recognize the fact that the present invention is not limited to a particular hardware system and transmission medium. The present invention is applicable to any peak-limited channel system. For example, magnetic storage media and telephone lines, etc.

Turning now to the operation of the modified FTC receiver 300, at the beginning of a block interval: a block of signals is copied from the INPUT SIGNAL BUFFER 304; added to a secondary input 306 at a summer 308; and then stored in a FFT INPUT BUFFER 310. Normally, the data blocks require only one signal block to transmit. In this case, the secondary input is zero. In those cases where several signal blocks contribute to a block of data, the secondary input for the first signal block is zero, and the secondary input for subsequent signal blocks is an accumulated signal block that resides in the FFT INPUT BUFFER 310. Providing the proper secondary input signals to the adder is one of the functions of the REPEAT CONTROL LOGIC unit 302.

Figure 4:
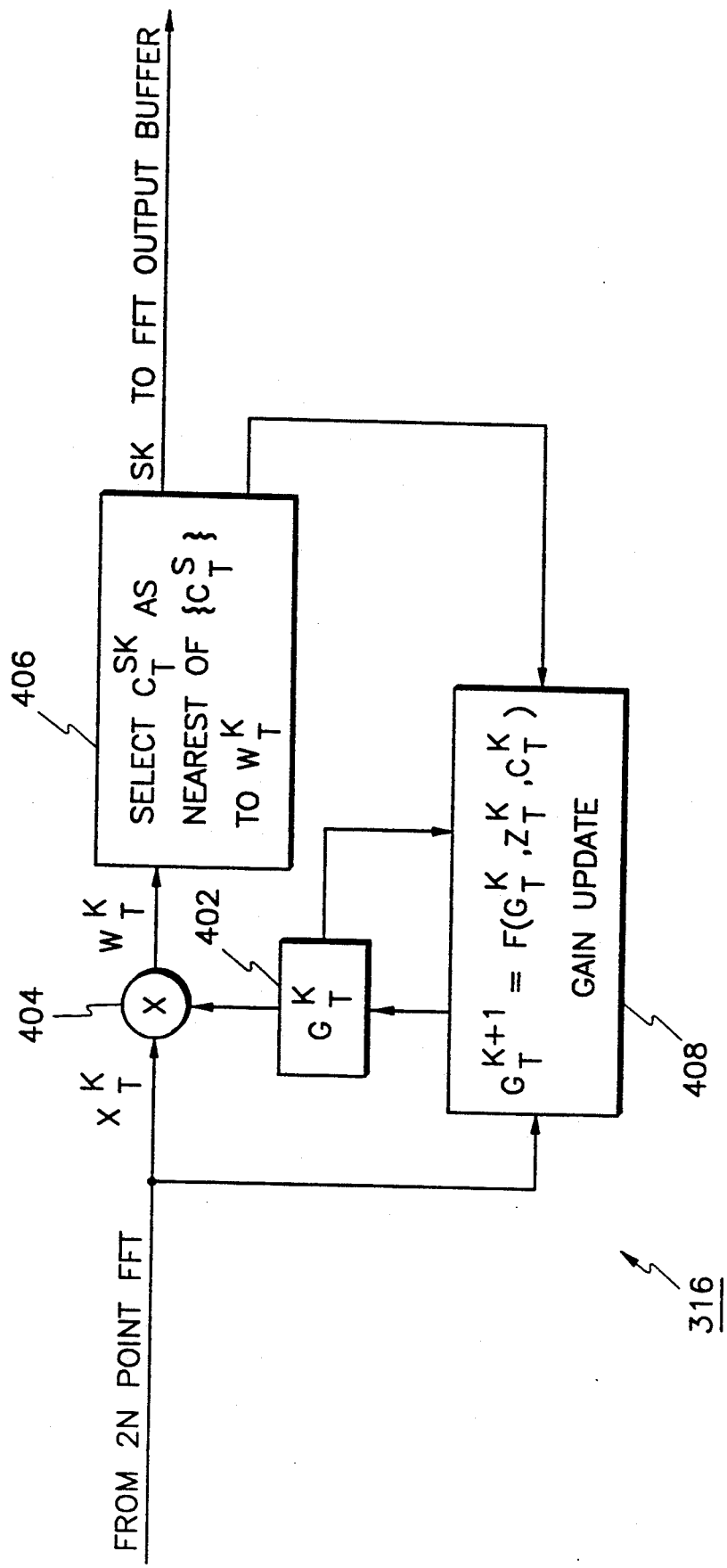
FIG. 4 shows a block diagram of a $T^{the}$ decoder of the receiver system of FIG. 3.

The contents of the FFT INPUT BUFFER 310 provide the input to a 2N POINT FFT unit 312. Each output 314 of the FFT 312 is passed to a DECODER 316. It is the function of the DECODERs 316 to determine the bit sequence sent by the transmitter. A more detailed description of the logic of the DECODERs 316 is provided in FIG. 4. Special information that contains the "repeat indication" is determined by DECODER R, and this information is provided to the REPEAT CONTROL LOGIC unit 302 (see reference numeral 318).

Decoded data 320 is accumulated in an FFT OUTPUT DATA BUFFER 322. If another signal block is not required to complete the transmission of this data block, the decoded data is copied into an OUTPUT DATA STORE 324. The REPEAT CONTROL LOGIC unit 302 signals the OUTPUT DATA STORE 324 to indicate when this should happen (see reference numeral 326).

DECODER IN MODIFIED FTC RECEIVER

The operation of each of the N DECODERs 316 is identical, except for the signals and parameters on which they operate. The operation of DECODER T, will now be described with reference to FIG. 4, where the T is an index that describes one of the decoders.

The DECODER T accepts a complex number input $X_T^K$ from the 2N POINT FFT unit 312, multiplies it by an attenuation factor $G_T^K$ (402) at a multiplier 404, for example, the output of which is a complex number $W_T^K$. A selector unit 406 then selects a complex number $C_T^{SK}$ in its "constellation" (i.e., the set of points $\{C_T^S\}$), that is the best candidate match. The index of this match, SK, is the decoder output. Note that the attenuation factor $G_T^K$, is a complex number chosen to compensate for channel attenuation and phase distortion.

The decoder typically updates the attenuation factor after each received block using a GAIN UPDATE unit 408. The updated attenuation, $G_T^{K+1}$ is determined as a function of the prior attenuation actor, $G_T^K$, the received data, $X_T^K$, and the chosen constellation point $C_T^{SK}$. The operation of the decoder is similar to standard Fourier Transform Coding.

RECEIVER REPEAT CONTROL LOGIC Unit

Figure 5:
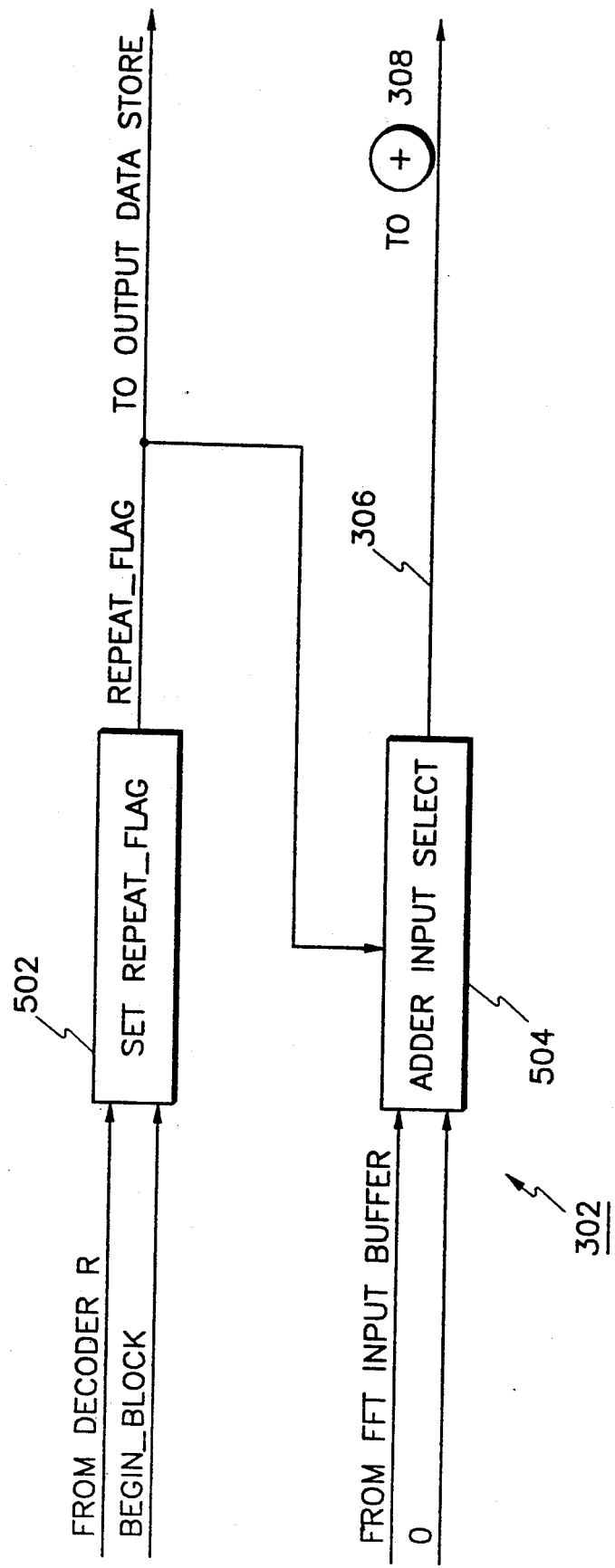
FIG. 5 shows a block diagram of the receiver repeat block control subsystem of the receiver system of FIG. 3.

The RECEIVER REPEAT CONTROL LOGIC unit 302 is shown in further detail in FIG. 5. The RECEIVER REPEAT CONTROL LOGIC unit 302 determines whether another input (e.g., received) signal block is needed to complete the transmission of the data block. Unit 302 provides the secondary input 306 to the adder 308, and it signals the OUTPUT DATA STORE 324 to either accept, or not accept, the signals from the FFT OUTPUT DATA BUFFER 322.

From DECODER R, an integer is received. Based on the value of this number, the REPEAT CONTROL LOGIC unit 302 determines whether another signal block is required to complete the transmission of the data block. This determination is made by a SET REPEAT—FLAG unit 502 at the time the BEGIN—BLOCK signal is received. The SET REPEAT—FLAG unit 502 then outputs a REPEAT—FLAG signal which is provided to the OUTPUT DATA STORE 324.

The REPEAT—FLAG signal is also used by an ADDER INPUT SELECT unit 504. The ADDER INPUT SELECT unit 504 determines whether the adder receives, as its secondary input, a previously accumulated signal from the FFT INPUT BUFFER 310, or a zero (0) signal.

The present system and method may be readily implemented in software by those skilled in the art using known FTC techniques. Alternatively, a hardware system could also be used employing an acoustic wave device for the 2N Point FFT units, as will also become apparent to those skilled in the art.

CHOICE OF THE THRESHOLD Θ AND THE REPETITION FACTOR X

The threshold Θ is chosen along with the FTC code as a design parameter to meet a desired error probability. A good choice for Θ is the design-point noise power of the entire block. Thus, if the signal and noise powers of the $T^{the}$ channel at the receiver are $S_T^2$ and $N_T$, respectively, then we take:

$$\theta = \sum_{1}^{N} N_T$$

For clipping errors whose magnitude squared sum to $\theta < \Theta$, the signal-to-noise ratio at the $T^{the}$ channel is:

$$SNR_T = \frac{S_T^2 d_T^2}{N_T + \theta/N}$$

where $d_T$ is the minimum Euclidean distance between an two members of the constellation (the distance between so-called nearest neighbors) for the code assigned to the $T^{th}$ channel. The probability of error at the $T^{th}$ channel (for uncoded FTC) is then $$c_T Q\left(\frac{d_T \sqrt{SNR_T}}{\sqrt{2}}\right)$$

where $c_T$ is the number of nearest neighbors in the constellation assigned to the $T^{th}$ channel, and:

$$Q(\lambda) = \frac{1}{\sqrt{2\pi}} \int_{\lambda}^{\infty} e^{-\lambda^2/2} d\lambda$$

is the complementary cumulative probability function.

The repetition parameter X may be chosen as a fixed value, say 2. The code may be designed so that the probability that the sum squared of the clipping error of the attenuated signal (power attenuated by 1/X) is negligibly small.

Alternatively, if the sum squared of the clipping error is Y, then X may be chosen as the least integer such that attenuation of the signal power by 1/Y yields a signal for which the sum squared of the clipping error is at most Θ. One way of determining such Y is by iteration at the encoder.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit and scope of the invention.

What is claimed is:

1. A method for fourier transform coding of data on peak limited channels using a redundancy scheme, comprising the steps of:

(1) sectioning the data into contiguous blocks;

(2) coding each block in the frequency domain;
(3) computing the Inverse Discrete Fourier Transform (IDFT) of each coded block;
(4) clipping each transformed block at predetermined peak values to thereby derive clipping error values;
(5) determining the magnitude square of said clipping error values;
(6) summing the magnitude square values of the clipping error for each block; and
(7) determining if said sum exceeds a predetermined threshold for a given block, then:
 (i) transmitting said block X number of times, each time using less than the prescribed power for said transmission, otherwise:
 (ii) transmitting a continuous signal whose sampled values at the Nyquist rate are the clipped values of the IDFT for that particular block.

2. A method according to claim 1, wherein X is equal to 2.

3. A method according to claim 1, wherein said fixed number of transmissions are sent using 1/X of the prescribed power for transmission.

4. A method according to claim 1, wherein said threshold is variable.

5. A method according to claim 1 further comprising the step of:
assigning a flag to each block to indicate whether the block is redundant.

6. A method according to claim 5, wherein said flag accepts one of two possible complex numbers which are far apart in Euclidean distance so that the probability of error as a result of transmission is negligible.

7. A method according to claim 5, wherein said flag accepts one of several possible complex numbers which are far apart in Euclidean distance so that the probability of error as a result of transmission is negligible.

8. A method according to claim 5 further comprising the steps of:
decoding said data by performing a DFT;
checking the value of said flag for each block; and
summing consecutive blocks if said flag indicates that blocks are redundant.

9. A system for fourier transform coding of data on peak limited channels using a redundancy scheme, comprising:
(a) means for sectioning the data into contiguous blocks;
(b) means for coding each block in the frequency domain;
(c) means for computing the inverse Discrete Fourier Transform (DFT) of each coded block;
(d) means for clipping each transformed block at predetermined peak values to thereby derive clipping error values;
(e) means for determining the magnitude square of said clipping error values;
(f) means for summing the magnitude squared values of the clipping error for each block;
(g) means for determining if said sum exceeds a predetermined threshold for said given block; and
(h) means for transmitting a given block no more than X number of times, each time using 1/X of the prescribed power for said transmission if said sum exceeds said predetermined threshold for said given block, otherwise, transmitting a continuous signal whose sampled values at the Nyquist rate are the clipped value of the IDFT for that particular block.

10. A system according to claim 9, wherein X is equal to 2.

11. A system according to claim 9, wherein said fixed number of transmissions are sent using 1/X of the prescribed power for transmission.

12. A system according to claim 9, wherein said threshold is variable.

13. A system according to claim 9, further comprising:
means for assigning a flag to each block to indicate whether the block is redundant.

14. A system according to claim 13, wherein said flag accepts one of two possible complex numbers which are far apart in Euclidean distance so that the probability of error as a result of transmission is negligible.

15. A system according to claim 13, wherein said flag accepts one of several possible complex numbers which are far apart in Euclidean distance so that the probability of error as a result of transmission is negligible.

16. A system according to claim 13 further comprising:
means for decoding said data by performing a DFT;
means for checking the value of said flag for each block; and
means for summing consecutive blocks if said flag indicates that blocks are redundant.

17. A transmitter for fourier transform coding of data on peak limited channels using a redundancy scheme, comprising:
an input data store for storing the data;
a read data control unit for retrieving data blocks from said input data store and sequentially storing said data blocks into an input data buffer;
a plurality of N encoders, where N is an integer, for mapping subchannels of said data blocks onto signal constellations;
a dedicated encoder to map a repeat signal onto signal constellations, said repeat signal indicating whether further signal blocks will be used to complete the transmission of a given data block;
a 2N point inverse fast fourier transform encoder for performing the discrete fourier transform of said constellations, and storing the results in an output signal buffer; and
a repeat control block unit for
 sending said repeat signal to said read data control unit to signal it to retrieve a data block from said input data store and store a copy of said retrieved data block in said input data buffer upon receiving a block begin signal, said retrieved data block is also thereby mapped and encoded in said output signal buffer,
 receiving said data block from said output signal buffer.
 clipping said data block at predetermined peak values to thereby derive clipping error values,
 summing the magnitude squared values of the clipping error for said data block,
 determining if said sum exceeds a predetermined threshold, and
 determining whether said data block is to be transmitted X number of times, each time using less than the prescribed power for said transmission if said sum exceeds said predetermined threshold, otherwise, said repeat control block signals the transmission of a continuous signal whose sampled values at the Nyquist rate are the clipped values of the IDFT for said data block.

18. A transmitter according to claim 17, wherein X is equal to 2.

19. A transmitter according to claim 17, wherein said fixed number of transmissions are sent using 1/X of the prescribed power for transmission.

* * * * *